United States Patent [19]

Horikawa

[11] Patent Number: 4,876,452
[45] Date of Patent: Oct. 24, 1989

[54] RADIATION IMAGE READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 677,446

[22] Filed: Dec. 3, 1984

[30] Foreign Application Priority Data

Dec. 5, 1983 [JP] Japan ................................ 58-229570

[51] Int. Cl.$^4$ ............................................... G03C 5/16
[52] U.S. Cl. .................................. 250/327.2; 250/484.1
[58] Field of Search .................... 250/327.2, 347, 351, 250/484.1; 369/44, 122

[56] References Cited

U.S. PATENT DOCUMENTS

| | | | |
|---|---|---|---|
| 4,051,528 | 9/1977 | Yakeda | 250/327.2 |
| 4,356,398 | 10/1982 | Komaki et al. | 369/122 |
| 4,691,232 | 9/1987 | Lange | 250/327.2 |

FOREIGN PATENT DOCUMENTS 123942 11/1984 European Pat. Off. ......... 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image read-out apparatus comprises many stimulating ray sources and a single light deflector for making many beams of stimulating rays emitted by the stimulating ray sources impinge upon different portions of a stimulable phosphor sheet carrying a radiation image stored therein so that the different portions are scanned by the beams of stimulating rays in a main scanning direction. The stimulating ray sources are turned on pulsewise at timings deviated from each other so that they generate large outputs. The stimulable phosphor sheet is moved with respect to the beams of stimulating rays in a sub-scanning direction normal to the main scanning direction, and light emitted by the stimulable phosphor sheet when exposed to the beams of stimulating rays is detected and converted into electric image signals.

7 Claims, 3 Drawing Sheets

RADIATION IMAGE READ-OUT APPARATUS

BACKGROUND OF THE INVENTION

1. Field of the Invention

This invention relates to an apparatus for reading out a radiation image stored in a stimulable phosphor sheet. This invention particularly relates to a radiation image readout apparatus which quickly conducts image read-out even when stimulating ray sources of small outputs are used for stimulating the stimulable phosphor sheet.

2. Description of the Prior Art

When certain kinds of phosphors are exposed to a radiation such as X rays, α-rays, β-rays, γ-rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in proportion to the radiation energy stored. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy.

FIG. 1 is a schematic view showing an example of a radiation image read-out apparatus employed for reading out a radiation image stored in a stimulable phosphor sheet in the aforesaid radiation image recording and reproducing system.

In the apparatus of FIG. 1, a laser beam 1a of a predetermined intensity is emitted as stimulating rays by a laser beam source 1 to a galvanometer mirror 2. The laser beam 1a is deflected by the galvanometer mirror 2 to form a laser beam 1b impinging upon a stimulable phosphor sheet 3 positioned below the galvanometer mirror 2 so that the sheet 3 is scanned by the laser beam 1b in the main scanning direction, i.e. in the width direction of the sheet 3 as indicated by the arrow A. While the laser beam 1b impinges upon the stimulable phosphor sheet 3, the sheet 3 is conveyed in the sub-scanning direction as indicated by the arrow B, for example, by an endless belt device 9. There for, scanning in the main scanning direction is repeated at an angle approximately normal to the sub-scanning direction, and the whole surface of the stimulable phosphor sheet 3 is two-dimensionally scanned by the laser beam 1b. As the stimulable phosphor sheet 3 is scanned by the laser beam 1b, the portion of the sheet 3 exposed to the laser beam 1b emits light having an intensity proportional to the radiation energy stored. The light emitted by the stimulable phosphor sheet 3 enters a transparent light guide member 4 from its light input face 4a positioned close to the sheet 3 in parallel to the main scanning line. The light guide member 4 has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its light input face 4a is guided inside of the light guide member 4 up to the rear end portion 4c, and received by the photomultiplier 5. Thus the light emitted by the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored in a magnetic tape 8, or directly reproduced as a hard copy on a photographic material or the like.

In order to make the aforesaid radiation image read-out apparatus small, the stimulating ray source should be made small. As the stimulating ray source satisfying this need, a laser diode (hereinafter abbreviated as LD) is suitable. However, in general, the output of LDs is small, and the sensitivity of the stimulable phosphor sheet to the long-wavelength light which is the principal part of the light that the LD emits is markedly low. Therefore, when an LD is used as the stimulating ray source, image read-out cannot be achieved sufficiently or the read-out speed becomes low.

The aforesaid problem can be solved by using a plurality of LDs and combining the laser beams emitted thereby by substantially merging or coalescing the beams into a single laser beam to obtain stimulating rays of high-intensity. However, it is technically difficult to combining the optical axes of many laser beams deflected by light deflectors. The read-out speed can also be increased by combining the LDs with light deflectors and light guide members to form a plurality of scanning systems and scanning different portions of the stimulable phosphor sheet simultaneously by the scanning systems. However, when a plurality of scanning systems are used, the read-out apparatus becomes large and the aforesaid aim of making the apparatus small cannot be accomplished.

SUMMARY OF THE INVENTION

The primary object of the present invention is to provide a radiation image read-out apparatus which is small in size.

Another object of the present invention is to provide a radiation image read-out apparatus which accomplishes sufficient image read-out at high read-out speeds even when stimulating ray sources of small outputs, such as LDs, are used.

The present invention provides a radiation image read-out apparatus comprising:

(i) a plurality of stimulating ray sources,
(ii) a single light deflecting means for receiving beams of stimulating rays emitted by said stimulating ray sources and for making said beams of stimulating rays impinge upon different portions of a stimulable phosphor sheet carrying a radiation image stored therein so that said different portions of said stimulable phosphor sheet are scanned by said beams of stimulating rays in a main scanning direction, (iii) a stimulating ray source drive control means for pulsewise turning on said stimulating ray sources at timings deviated from each other, (iv) a sub-scanning means for moving said stimulable phosphor sheet with respect to said beams of stimulating rays in a sub-scanning direction approximately normal to the main scanning direction, (v) a single light guide member having a light input face extending in the main scanning direction close to a scanning line in the main scanning direction, said light guide member guiding light entering from said light input face up to a light output face thereof, and (vi) a photodetector connected with said light output face of said light guide member.

In the radiation image read-out apparatus of the present invention, small light sources of small outputs, such as LDs or light emitting diodes (LEDs), are used as stimulating ray sources so that a sufficient read-out capacity and a high read-out speed can be realized. Therefore, the apparatus can be made very small. Further, since LDs and LEDs are markedly inexpensive as compared with gas laser beam generators or the like, the apparatus can be made at a low cost.

When the LDs or the LEDs used as the stimulating ray sources are turned on pulsewise, they generate outputs larger than when they are turned on continuously. When the stimulating ray sources are turned on pulsewise to obtain large outputs, the scanning speed in the main scanning direction cannot be increased to such an extent as when the stimulating ray sources are turned on continuously. However, since one stimulating ray source is turned on while the other stimulating ray sources are turned off so that a plurality of portions of the stimulable phosphor sheet are simultaneously scanned in the main scanning direction, it becomes possible to increase the scanning speed as in the case where a single stimulating ray source of a large output is turned on continuously.

It should be noted that in this specification "moving a stimulable phosphor sheet with respect to beams of stimulating rays in the sub-scanning direction" means movement of the stimulable phosphor sheet relative to the beams of stimulating rays and includes both the movement of the stimulable phosphor sheet with the beams of stimulating rays standing still in the sub-scanning direction and the movement of the beams of stimulating rays in the sub-scanning direction with the sheet standing still.

DESCRIPTION OF THE PREFERRED EMBODIMENTS

The present invention will hereinbelow be described in further detail with reference to the accompanying drawings.

Figure 1:
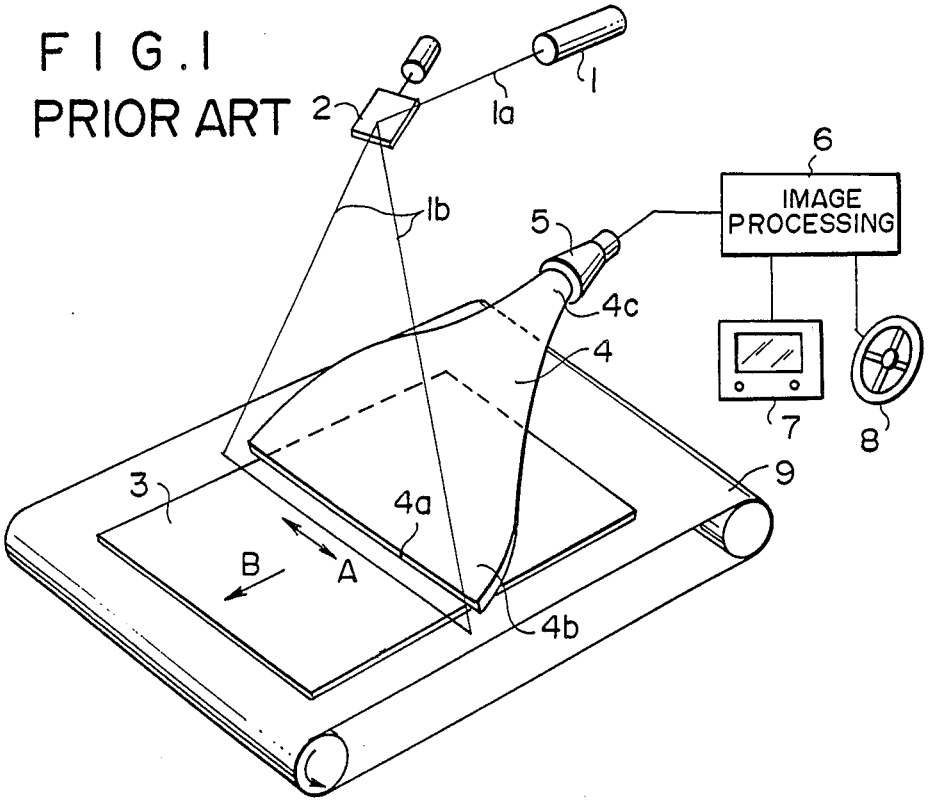
FIG. 1 is a schematic view showing the conventional radiation image read-out apparatus.
Figure 2:
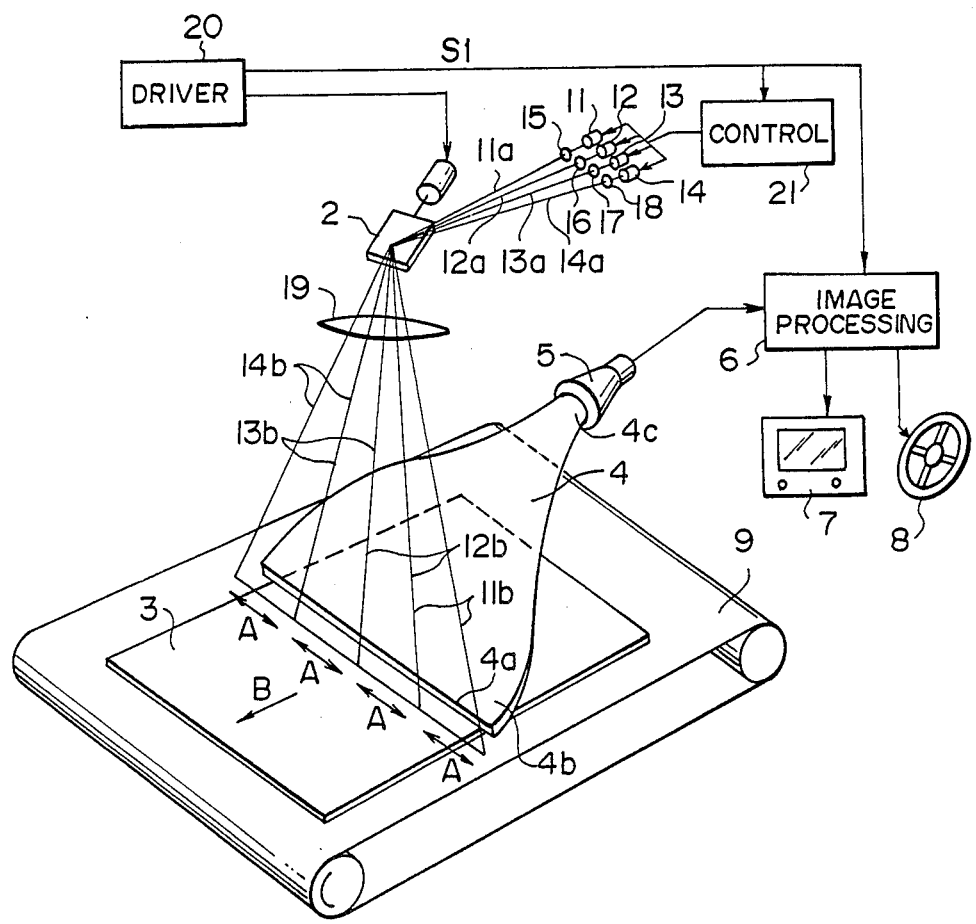
FIG. 2 is a schematic view showing an embodiment of the radiation image read-out apparatus in accordance with the present invention.

FIG. 2 schematically shows an embodiment of the radiation image read-out apparatus in accordance with the present invention. In FIG. 2, similar elements are numbered with the same reference numerals with respect to FIG. 1. (This also applies to FIG. 4.) In this embodiment, LDs 11, 12, 13, and 14 are used as the stimulating ray sources to emit laser beams 11a, 12a, 13a, and 14a. The laser beams 11a, 12a, 13a, and 14a impinge upon the galvanometer mirror 2 via collimating lenses 15, 16, 17 and 18 and are deflected by the galvanometer mirror 2 to form laser beams 11b, 12b, 13b, and 14b. The laser beams 11b, 12b, 13b, and 14b are converged by a converging lens 19 and impinge upon the stimulable phosphor sheet 3 so that the sheet 3 is scanned by the laser beams in the main scanning direction as indicated by the arrows A. The LDs 11, 12, 13, and 14 are positioned so that the end points of scanning by the laser beams 11b, 12b, and 13b in the main scanning direction adjoin the start points of scanning by the adjacent laser beams 12b, 13b, and 14b in the main scanning direction, thereby forming one continuous scanning line in the main scanning direction over the whole width of the stimulable phosphor sheet 3.

Figure 3:
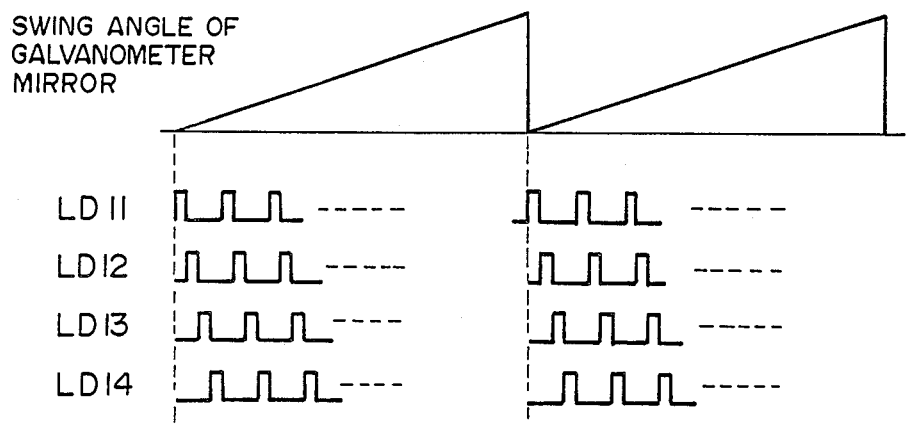
FIG. 3 is a graph showing the timing of turning on the stimulating ray sources in the embodiment of FIG. 2.

The LDs 11, 12, 13, and 14 are controlled by a stimulating ray source drive control circuit 21, which receives a synchronizing signal S1 from a driver 20 for driving the galvanometer mirror 2, and are turned on pulsewise at timings as shown in FIG. 3. That is, the LDs 11, 12, 13, and 14 are turned on at timings deviated from each other so that one LD lights while the other LDs are turned off. By way of example, an LD commercially available at present generates a maximum output of several tens of watts when the LD is turned on pulsewise at a duty ratio of 0.03%. When the LDs 11, 12, 13, and 14 are turned on pulsewise to obtain such large outputs, the scanning speed in the main scanning direction cannot be increased to such an extent as when the stimulating ray sources are turned on continuously. However, since one LD is turned on while the other LDs are turned off, four portions of the stimulable phosphor sheet 3 in the width direction thereof (i.e. in the main scanning direction) are simultaneously scanned in the main scanning direction by a single deflecting operation of the galvanometer mirror 2. That is, the scanning speed in the main scanning direction becomes approximately four times that achieved in the case where the whole width of the stimulable phosphor sheet 3 is scanned by a single beam of stimulating rays. Therefore, the disadvantage of turning on the LDs 11, 12, 13, and 14 pulsewise can be made up for and the scanning speed in the main scanning direction can be increased. Further, since the laser beams 11a, 12a, 13a, and 14a emitted by the LDs 11, 12, 13, and 14 have high energy as described above, it becomes possible to accomplish sufficient image read-out.

The synchronizing signal S1 is sent to the image processing circuit 6, and the output of the photomultiplier 5 sent to the image processing circuit 6 is divided into signals of respective scanning portions on the basis of the synchronizing signal S1.

Figure 4:
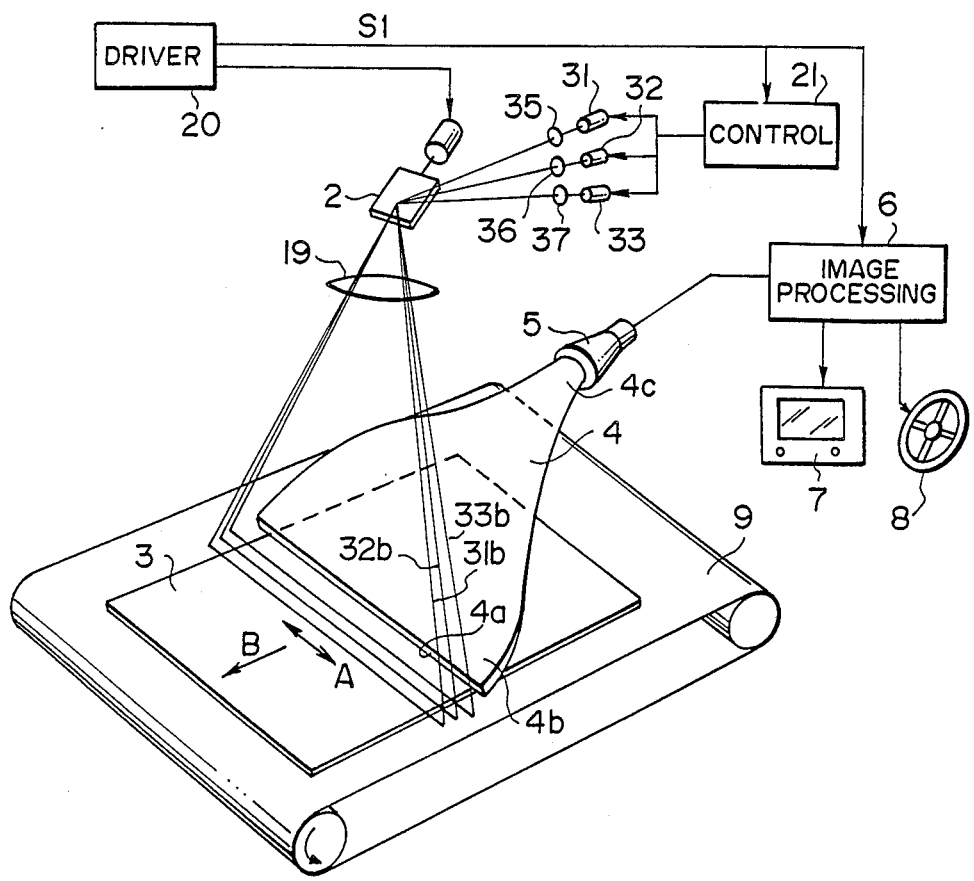
FIG. 4 is a schematic view showing another embodiment of the radiation image read-out apparatus in accordance with the present invention.

FIG. 4 shows another embodiment of the radiation image read-out apparatus in accordance with the present invention. In this embodiment, LDs 31, 32, and 33 are positioned so that laser beams 31b, 32b, and 33b emitted thereby stand side by side in the sub-scanning direction on the stimulable phosphor sheet 3. Thus a plurality of portions (three portions in this embodiment) of the stimulable phosphor sheet 3 in the sub-scanning direction are simultaneously scanned by laser beams 31b, 32b, and 33b by a single deflecting operation of the galvanometer mirror 2. (Reference numerals 35, 36, and 37 denote collimating lenses.) In this case, the scanning speed in the sub-scanning direction is increased and, as a result, the image read-out speed becomes high. In the image processing circuit 6, the output of the photomultiplier 5 is divided into signals of respective scanning lines in the main scanning direction on the basis of the synchronizing signal S1.

It is also possible to position stimulating ray sources in the matrix form so that a plurality of portions of the stimulable phosphor sheet 3 in the sub-scanning direction are simultaneously scanned in the main scanning direction as in the case of the embodiment of FIG. 4 and, at the same time, each scanning line in the main scanning direction is formed by simultaneous scanning of a plurality of portions in the main scanning direction as in the case of the embodiment of FIG. 2, thereby further increasing the read-out speed. The number of portions scanned simultaneously is not limited to four and three as in the embodiments of FIGS. 2 and 4. However, in the embodiment of FIG. 4, the number of the portions scanned simultaneously must be limited to such a number that the light emitted by the stimulable phosphor sheet 3 along the scanning lines in the main scanning direction can enter the light input face 4a of the light guide member 4. Instead of the LDs, it is possible to use any other stimulating ray sources, such as LEDs, that generate improved outputs when turned on pulsewise. When the LDs, LEDs, or the like are used, it is possible to use an array of a plurality of such devices. As the light deflecting means, it is also possible to use a polygonal mirror or a piezoelectric device on which a vibration plate secured to a mirror is supported so that the mirror is vibrated when a voltage is applied to the piezoelectric device. Further, instead of using the synchronizing signal S1 for dividing the output of the photodetector into signals of respective scanning portions, it is also possible to make synchronizing light impinge upon the light deflecting means such as the galvanometer mirror. In this case, light reflected by the light deflecting means is detected by a linear encoder or the like to detect the swing angle of the light deflecting means. The timing of turning on the stimulating ray sources is measured on the basis of the swing angle, and a timing signal is sent to the image processing circuit 6.

I claim:
1. A radiation image read-out apparatus comprising:
 (i) a plurality of stimulating ray sources,
 (ii) a single light deflecting means for receiving beams of stimulating rays emitted by said stimulating ray sources and for making said beams of stimulating rays impinge on different portions of a stimulable phosphor sheet carrying a radiation image stored therein so that said different portions of said stimulable phosphor sheet are scanned by said beams of stimulating rays in a main scanning direction, each of said beams traversing a respective one of said different portions,
 (iii) a stimulating ray source drive control means for pulsewise turning on said stimulating ray sources at timings deviated from each other,
 (iv) a sub-scanning means for moving said stimulable phosphor sheet with respect to said beams of stimulating rays in a sub-scanning direction approximately normal to the main scanning direction,
 (v) a single light guide member having a light input face extending in the main scanning direction close to a scanning line in the main scanning direction, said light guide member guiding light entering from said light input face up to a light output face thereof, and
 (vi) a photodetector connected with said light output face of said light guide member.

2. An apparatus as defined in claim 1 wherein said stimulating ray sources are positioned so that the different portions of said stimulable phosphor sheet on one scanning line in the main scanning direction are scanned by said beams of stimulating rays.

3. An apparatus as defined in claim 2 wherein said stimulating ray sources are positioned so that end points of scanning by said beams of stimulating rays in the main scanning direction adjoin the start points of scanning by the adjacent beams of stimulating rays in the main scanning direction, thereby forming one continuous scanning line in the main scanning direction over the whole width of said stimulable phosphor sheet.

4. An apparatus as defined in claim 1 wherein said stimulating ray sources are positioned so that the different portions of said stimulable phosphor sheet standing side by side in the sub-scanning direction are scanned by said beams of stimulating rays.

5. An apparatus as defined in any of claims 1 to 4 wherein said stimulating ray sources are laser diodes.

6. An apparatus as defined in any of claims 1 to 4 wherein said stimulating ray sources are light emitting diodes.

7. An apparatus as defined in claim 1 wherein only a single photodetector is provided to receive the light entering from said light input face of said single light guide member.

* * * * *